United States Patent
Dube et al.

(10) Patent No.: US 7,817,624 B2
(45) Date of Patent: *Oct. 19, 2010

(54) METHODS AND SYSTEMS FOR CONFIGURING VOICE OVER INTERNET PROTOCOL NETWORK QUALITY OF SERVICE

(75) Inventors: Deepak Dube, Marlboro, NY (US); Michael Fornatore, Middleton, NJ (US)

(73) Assignee: AT&T Intellectual Property II, L.P., Reno, NV (US)

( * ) Notice: Subject to any disclaimer, the term of this patent is extended or adjusted under 35 U.S.C. 154(b) by 597 days.

This patent is subject to a terminal disclaimer.

(21) Appl. No.: 11/829,692

(22) Filed: Jul. 27, 2007

(65) Prior Publication Data
US 2007/0268841 A1 Nov. 22, 2007

Related U.S. Application Data

(63) Continuation of application No. 10/421,456, filed on Apr. 23, 2003, now Pat. No. 7,251,216.

(51) Int. Cl.
| | |
|---|---|
| H04L 12/26 | (2006.01) |
| H04J 1/16 | (2006.01) |
| G08C 15/00 | (2006.01) |
| G06F 11/00 | (2006.01) |
| G01R 31/08 | (2006.01) |

(52) U.S. Cl. .................. 370/352; 370/232; 370/254; 370/395; 709/242

(58) Field of Classification Search ......... 370/232–254, 370/332–455; 709/226–233, 242–245
See application file for complete search history.

(56) References Cited

U.S. PATENT DOCUMENTS

| | | | |
|---|---|---|---|
| 6,262,976 B1 | 7/2001 | McNamara | |
| 6,430,154 B1 | 8/2002 | Hunt et al. | |
| 6,473,434 B1 | 10/2002 | Araya et al. | |
| 6,510,219 B1 | 1/2003 | Wellard et al. | |
| 6,515,963 B1 | 2/2003 | Bechtolsheim et al. | |
| 6,847,611 B1 | 1/2005 | Chase et al. | |
| 7,000,015 B2 | 2/2006 | Moore et al. | |
| 7,031,266 B1 | 4/2006 | Patel et al. | |
| 7,283,561 B1 * | 10/2007 | Picher-Dempsey | 370/468 |

(Continued)

FOREIGN PATENT DOCUMENTS

EP 1035751 7/2004

(Continued)

OTHER PUBLICATIONS

EP Examination Report for 04101709.6 dated Oct. 1, 2007.

(Continued)

*Primary Examiner*—M. Phan

(57) ABSTRACT

Automated methods and systems for determining and setting router QoS adjustments to control the service level of VoIP voice communications in a packet switching network supporting both voice and data communications. Network topology and service level requirements are processed to determine QoS settings for each of the routers. The QoS settings are transmitted to the routers, for example in the form of a router configuration file, to set the QoS adjustments to achieve the desired VoIP service level. The invention is applicable to packet switching networks comprising routers or equivalent electronic switches providing electronically adjustable QoS settings.

20 Claims, 4 Drawing Sheets

U.S. PATENT DOCUMENTS

| | | |
|---|---|---|
| 7,394,808 B2 * | 7/2008 | Figueira et al. ............. 370/389 |
| 7,423,965 B2 * | 9/2008 | Freytsis et al. ............. 370/229 |
| 7,500,015 B2 * | 3/2009 | Hiyama et al. ............. 709/242 |
| 7,586,923 B2 * | 9/2009 | Zhao et al. ............. 370/395.52 |
| 2002/0062376 A1 | 5/2002 | Isoyama |
| 2003/0123446 A1 | 7/2003 | Muirhead et al. |
| 2003/0161328 A1 | 8/2003 | Chase et al. |
| 2004/0105446 A1 * | 6/2004 | Park et al. ............. 370/395.21 |
| 2006/0062141 A1 | 3/2006 | Oran |
| 2006/0126536 A1 | 6/2006 | Patel et al. |
| 2006/0182034 A1 | 8/2006 | Klinker et al. |
| 2007/0297335 A1 * | 12/2007 | Picher-Dempsey .......... 370/235 |
| 2008/0080543 A1 * | 4/2008 | Hickox et al. ............... 370/419 |
| 2008/0298370 A1 * | 12/2008 | Yoshimoto et al. ..... 370/395.31 |
| 2009/0180445 A1 * | 7/2009 | Ue ............................. 370/332 |

FOREIGN PATENT DOCUMENTS

| | | |
|---|---|---|
| WO | WO-02/05068 | 1/2002 |

OTHER PUBLICATIONS

EP Search Report dated Sep. 26, 2006 for Application No. 04 101 709.6-1249;consists of 5 unnumbered pages.

* cited by examiner

METHODS AND SYSTEMS FOR CONFIGURING VOICE OVER INTERNET PROTOCOL NETWORK QUALITY OF SERVICE

CROSS REFERENCE TO RELATED APPLICATIONS

This application is a continuation of U.S. patent application Ser. No. 10/421,456 filed Apr. 23, 2003 (which will issue as U.S. Pat. No. 7,251,216 on Jul. 31, 2007), which is incorporated herein by reference in its entirety.

FIELD OF THE INVENTION

The present invention relates generally to packet switching networks and more particularly to methods and systems for configuring network nodes to manage the quality of service of voice over Internet protocol telephony.

BACKGROUND OF THE INVENTION

Conventional circuit-switched telephony, known in the art as the public switched telephone network (PSTN), has the well-recognized disadvantage of requiring that a physical communications line be held open throughout an entire conversation between two communicating parties. A complex infrastructure of circuits and switches exists to establish and hold such lines for every PSTN telephone call. Because only a small percentage of the available bandwidth is actually used during each call, the PSTN system is inefficient and the infrastructure costs burdensome.

Newer, packet switching telephony technology integrates telephony with digital network technology. This packet switching technology codes telephony communications into digital packets, transfers the packets using non-dedicated, dynamically established routing between network servers, and decodes the digital packets at the receiving end to recreate the communication. Each packet may take a different path through a network, the connection between the parties being virtual, i.e. a permanent virtual connection (PVC), rather than physical in nature. Because packet switching telephony does not require a dedicated line, it is generally more efficient and cost-effective than PSTN telephony. However, packet switching communications requires complex software controls and communications commands, known as protocols, to establish, use and then close the virtual network connections between parties.

With the establishment of the Internet, the largest high-speed digital communications network in the world, protocols, such as voice over Internet protocols (VoIP), were established to support telephone communications over the Internet. One early set of protocols was known as H.323, a standard created by the International Telecommunications Union (ITU). A more recent set of VoIP protocols comprises Session Initiation Protocol (SIP) developed under the auspices of the Internet Engineering Task Force (IETF). Both H.323 and SIP provide standardized protocols for VoIP telephony, with SIP considered to be somewhat simpler and more flexible than H.323.

As VoIP telephony has become more prevalent, it has concomitantly become necessary for voice to share hardware and software resources in packet switching networks with other types of data. As expected, each of the different data types has it's own service requirements. Voice service, for example, requires relatively low throughput, low delay and low packet loss. In contrast, file transfer protocol (FTP) data, operating under TCP protocols, requires relatively higher throughput but will tolerate longer delays and potentially higher packet loss. For each different service type, service requirements define the minimally acceptable network behavior for that service type. QoS parameters are derived for an Internet protocol (IP) network to meet those service requirements. As will be described in further detail below, QoS can be measured on different networks for different data types. Network operations can be adjusted to meet the QoS requirements for various data types.

For VoIP telephony, voice service standards were established by the ITU and published as ITU-T G114, the standards defined with respect to a variety of parameters including: one-way delay, jitter, throughput (dependent on coding algorithms employed), coding cycle restrictions, packet loss and service availability. In a wide area network (WAN) environment such as a typical enterprise WAN, a permanent virtual circuit is established between the transmission and receiver sources. Enterprise WANs consist of a variety of hardware components, the principal components comprising routers and switches, which are commercially available, programmable network nodes; they are capable of receiving and transmitting data packets, including VoIP data packets, in accordance with appropriate protocols. Routers and switches are programmable by the operator, each of them generally being set up in a manner to optimally handle anticipated network traffic.

Network routers inherently develop queues of data packets, the data packets processed in accordance with the programmed, controllable settings of the routers. These router settings, along with the resultant handling of the data packets, directly affect the service levels of the various data services handled by the routers. Routers are thus provided with adjustable operating parameters, the operating parameters typically set by software. Adjustable router operating parameters typically include parameters that affect QoS and thus directly affect voice and data service levels. Router QoS 'tool chests' enable operators to set these QoS parameters to control the interaction of voice and data in the network. However, adjusting router settings to meet QoS requirements is a complex effort. As noted above, different types of data services have different service requirements. As voice becomes integrated with data through VoIP telephony, QoS parameters must be set so that the service requirements for telephony are met in addition to the service requirements for other data types. Further, many geographically disperse routers handling many different data applications are required to support VoIP, making the configuration of those routers complex and difficult.

Different conceptualizations of and at least partial solutions are known to these problems in the art. For example, U.S. Pat. No. 6,430,154 to Hunt et al. shows methods and systems for supporting multiple application traffic types on networks where elastic and inelastic data are determined and handled differently. U.S. Pat. No. 6,510,219 to Wellard et al. shows an alternate network fallback solution for IP telephony wherein QoS is monitored and, if it falls below a first threshold, a connection over an alternate network is established. If the QoS falls below another predetermined threshold, the call is transferred to the alternate network connection. U.S. Pat. No. 6,515,963 to Bechtolsheim et al. shows a per-flow dynamic buffer management scheme for a data communications device.

There exists in the art a need for managing the service level of VoIP telephony in WANs operating multiple routers distributed over geographically disperse areas and supporting multiple data applications.

SUMMARY OF THE INVENTION

The present invention provides methods and systems for supporting the configuration of QoS parameters in routers connected to WANs to maintain the service standards required for VoIP telephony and other data applications.

In one embodiment, the invention is implemented as a Microsoft Windows™-based software tool.

Methods and systems are provided for generating QoS parameters to control routers to meet VoIP service standards, one exemplary method being a method of generating QoS settings to control the standard of service of voice communications in an Internet protocol packet switching network comprised of a plurality of routers, the method comprising the steps of: determining standard of service requirements for the voice over internet protocol (VoIP) voice communications; determining the network topology; determining the quality of service (QoS) adjustments available in the plurality of routers; processing the standard of service requirements and the network topology to determine QoS settings for the QoS adjustments in the plurality of routers; and generating the QoS settings to the plurality of routers.

DRAWING FIGURES

These and other objects, features and advantages of the present invention will become apparent from a consideration of the Description of the Invention in consideration with the Drawing Figures, in which.

DESCRIPTION OF THE INVENTION

The present invention provides an automated tool for setting router QoS adjustments in order to meet service level requirements for VoIP data on packet switching networks. While the invention is described with respect to Cisco™ brand routers, it is applicable to any routers having a basic QoS tool chest including such parameters as: PQ, WFQ, traffic shaping, compressed RTP and fragmentation, described in further detail below, enabling the software setting of router QoS parameters.

Further, while the invention is described with respect to Frame Relay (FR) and Asynchronous Transfer Mode (ATM) level 2 network protocols, it is applicable to any packet switching protocol wherein voice and other data types share limited bandwidth and resources allocated at least in part by router QoS settings.

Figure 1:
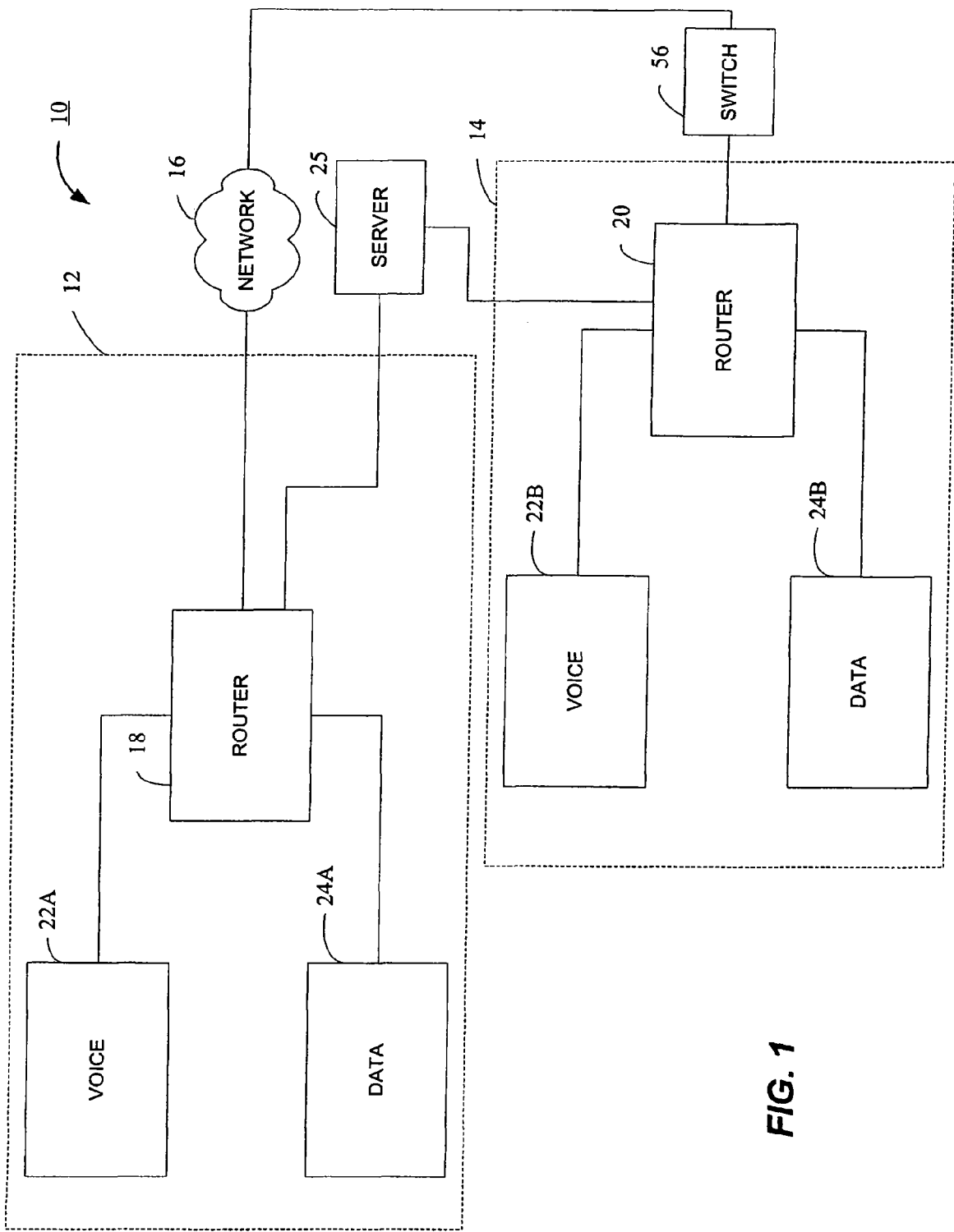
FIG. 1 is a block diagram showing a packet switching network system combining both voice and data.

With reference now to FIG. 1 there is shown at a high level a Wide Area Network (WAN) 10 supporting packet switching protocols and incorporating a first local voice and data network 12 connected to a second local voice and data network 14 through a large, enterprise FR or ATM network 16. Each of networks 12 and 14 supports a respective router, indicated at 18 and 20, connected to devices 22 for transmitting and receiving voice and devices 24 for transmitting and receiving data. For purposes of explanation, voice will be assumed to originate from source 22A on network 12 and terminate on destination 2B on network 14. Likewise, transmitted and received data is indicated at 24A and 24B. It will be understood that the network is bi-directional with voice and data transmitted simultaneously in both directions between networks 12 and 14. As described below, the routers operate to convert analog or digital voice into VoIP packets, the routers thus referred to in the industry as VoIP gateways.

Many devices are known for transmitting and receiving voice data in VoIP format, including but not limited to a VoIP telephone, a personal computer operating VoIP telephone software, i.e. a soft phone, and others. In the described embodiment, voice from a handset is transmitted to the router through a conventional private branch exchange (PBX) in digitized 64 kbps pulse code modulation (PCM) or in analog form from an ear and mouth analog trunk. Similarly, many devices are known for transmitting and receiving non-voice data in packet format, including but not limited to servers, mainframe computers, personal computers and others. A computer server 25, incorporating appropriate user interfaces, peripheral devices, and operating systems, many of which are well known in the art, is connected to network 16 for performing the steps of the present invention including processing QoS parameters in accordance with the rules set out below and transmitting those rules to the various network routers.

As noted, above, in the described embodiment, routers 18 and 20 each comprise a Cisco™ brand router, typically selected from the 1700, 2600, 3600, 3700 and/or 7200 families of routers supporting the CLIIOS functionality, or equivalents of Cisco™ or alternate brands. As described below, the present invention provides the proper commands, based on the network size and configuration information, necessary to program the selected router(s).

As discussed above, in contrast to dedicated lines, packet switching networks establish private virtual connects, PVC's, between parties to a voice communication. It will be understood that a PVC may be single in nature, constituting a single permanent virtual circuit shared by both voice and data, or dual in nature, constituting a separate PVC for each of voice and data. As is described in further detail below, both dual and single PVCs are prescribed by the present invention under different circumstances. Some WANs, for example AT&T's United States FR ATM network, allow sustained bursts to access rates well over the subscribed committed information rate (CIR). For these WANs, a dual PVC solution is recommended. A dual PVC solution isolates the voice PVC from the data PVC, allowing data to burst in its own PVC without using voice resources, thereby insuring adequate data application performance without adverse impact on voice. Other WANs, typically international FR/ATM networks, restrict bursting of CIR to the contractually committed rate. For these WANs, as is further discussed below, a single PVC solution is recommended. A single PVC solution allows data to utilize the entire CIR when no voice traffic is present.

As is also known in the art, international PSN network service providers charge substantially higher rates for data bandwidth sufficient to support bursting. Thus, international PSNs are typically configured as single PVC networks.

With respect to the following description of the invention, it will be understood that routers comprise combinations of hardware, software and firmware and are operable through the software and firmware to assume many different configurations. The block diagrams shown below represent generally functional blocks of configured routers, the configuration typically performed by combinations of hardware settings, e.g. hardware modules and dip switches, and software settings, e.g. the CLIIOS QoS commands developed in accordance with the invention as described below. It will be understood that, as described below, a single router may be set up to operate in different functional configurations. In the drawing Figures, like features and functions are identified by like reference numbers.

Figure 2:
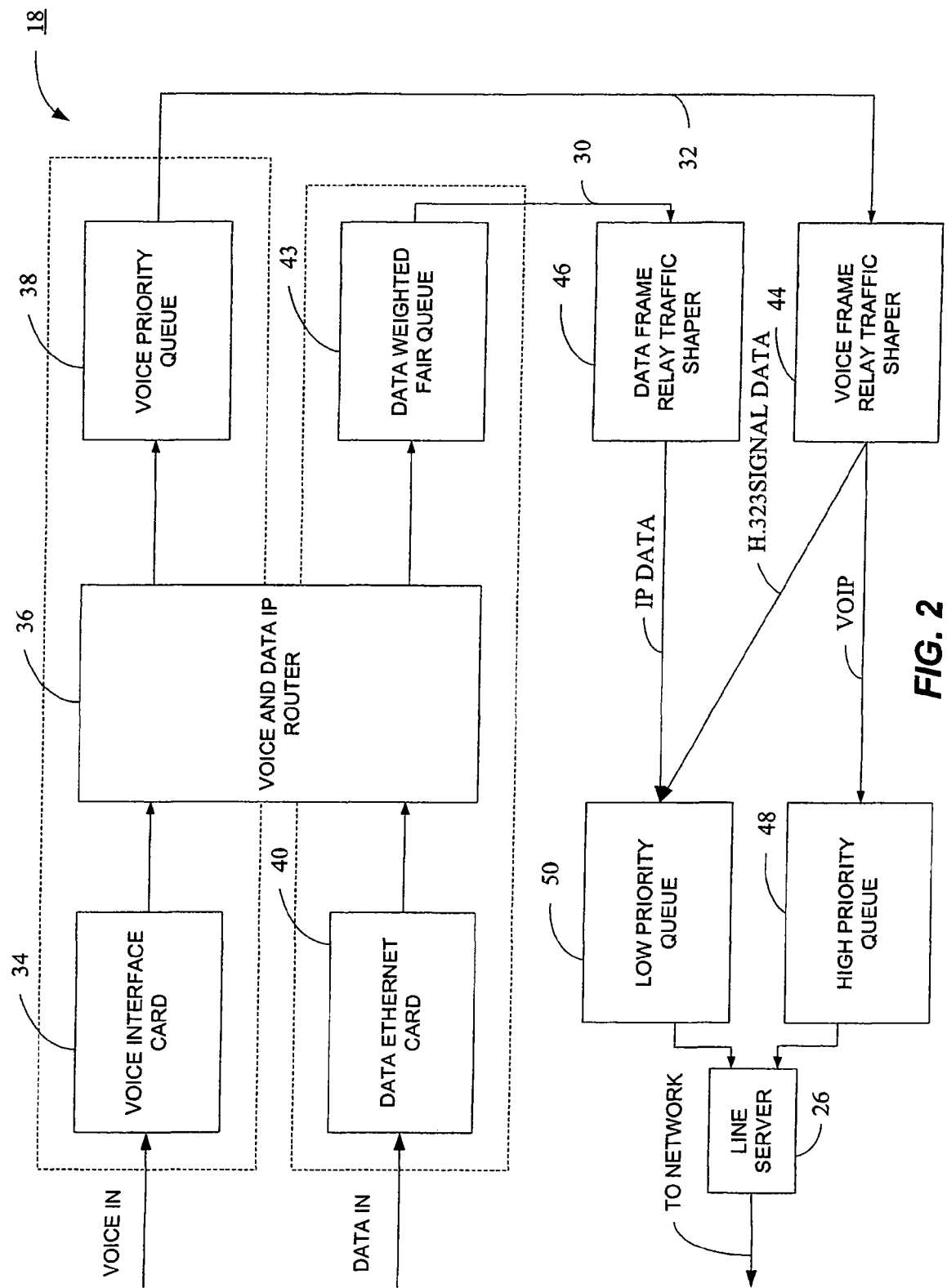
FIG. 2 is a block diagram showing functional transmission elements of the router of FIG. 1 in a dual-PVC system.

As will be further described below, one aspect of the present invention, in accordance with Rule 1 below, is the configuration of QoS for a network, through the configuration of its routers, for either a single or dual PVC. With reference now to FIG. 2, router 18 from FIG. 1 is shown functionally configured to support a dual PVC, U.S. national PSN network, the first PVC dedicated to voice indicated at 32, the second PVC dedicated to data indicated at 30.

Voice PVC 32 includes a voice interface card 34, typically a hardware component, connected to receive voice and signaling data from a voice device as described above, encapsulate the received data into VoIP packets and pass the packets to a voice and data IP router 36 for providing necessary IP routing to those voice packets. The processed VoIP packets are then placed in a voice priority queue 38 established in accordance with the engineering rules set out below. Similarly, data is received by a data Ethernet card 40, processed by the IP router 36 and queued in a data weighted fair queue 43 in accordance with the engineering rules set out below.

The outputs of voice priority queue 38 and data weighted fair queue 43 are connected respectively into voice frame relay traffic shaper 44 and data frame relay traffic shaper 46, respectively. As is known in the art, Cisco IOS QoS offers two types of traffic regulation mechanisms: policing and shaping. The rate-limiting features of committed access rate (CAR) and the traffic-policing feature provide the functionality for policing traffic. The features of general traffic shaping (GTS), class-based shaping, DTS, and FRTS provide the functionality for shaping traffic. These features can be deployed throughout the network to ensure that a frame, packet, or other data source adheres to a stipulated contract. These features can also be used to determine the QoS with which to render the packet. Both policing and shaping mechanisms use the traffic descriptor for a packet, indicated by the classification of the packet, to ensure adherence and service. Traffic policers and shapers identify traffic descriptor violations in an identical manner. These policers and shapers differ in how they respond to violations, for example: a policer drops traffic. For example, the CAR rate-limiting policer will either drop the packet or rewrite its IP precedence, resetting the type of service bits in the packet header; in contrast, a shaper delays excess traffic using a buffer, or queuing mechanism, to hold packets and shape the flow when the data rate of the source is higher than expected. For example, GTS and FRTS can use a weighted fair queue to delay packets to shape the flow. Thus, FRTS 44 operates to shape traffic on the PVC to maintain toll-grade voice service: low PDD, toll-grade voice quality in accordance with the invention below. Real time protocol (RTP) compression compresses IP/user datagram protocol (UDP)/RTP headers to reduce VoIP bandwidth to 13.328 kbps per call for G.729A/B codec.

Continuing with reference to FIG. 2, H.323 signal data from the voice packets is sent by the voice frame relay traffic shaper 44 and transmitted into a low priority queue 50 along with the data packets from data shaper 46. It will be understood that voice signal data is generally less sensitive to network delay than the actual voice data. The actual voice packets go into a high priority queue 48 as UDP traffic with source and destination ports in the range of 16384-32767. The queued data is transmitted onto network 16 via a line server in router 18.

Figure 4:
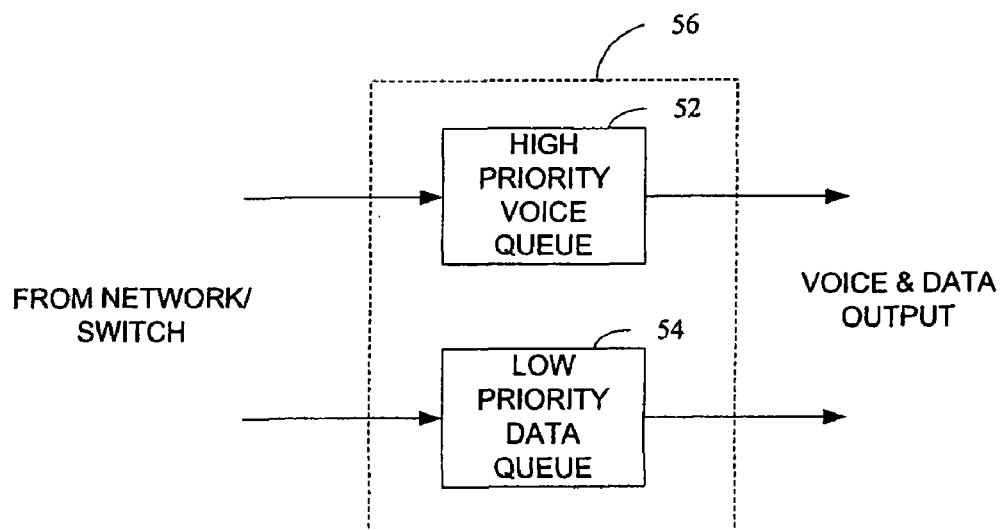
FIG. 4 is a block diagram showing the functional receiving elements of FIG. 1.

With reference now to FIG. 4, the data from router 18 is transmitted through a line server 26 over network 16, the line server comprising a function embedded in the router. The network is configured in the illustrative embodiment as described above as a FR or ATM network, the prioritized voice and data packets managed within the network accordingly. The VoIP packets experience little delay until egress of network 16 into the customer premises. At the egress switch of the WAN, switch 56, located at the WAN service provider pop receives the voice and data packets and, in accordance with the PVC that transmits the packets, sorts the PVC carrying VoIP and H.323 signaling packets into a high priority voice queue 52 and the data PVC packets into a low priority data queue 54, for output to the subsequent receiving customer-premise router 20. The VoIP high-priority queue 52 drains voice packets approximately fifteen times (15×) faster than low priority queue 54 drains data packets. Router 20 accepts packets at an effectively infinite rate, that is 45 Mbps, to insure processing of the VoIP packets without delay at ingress.

Figure 3:
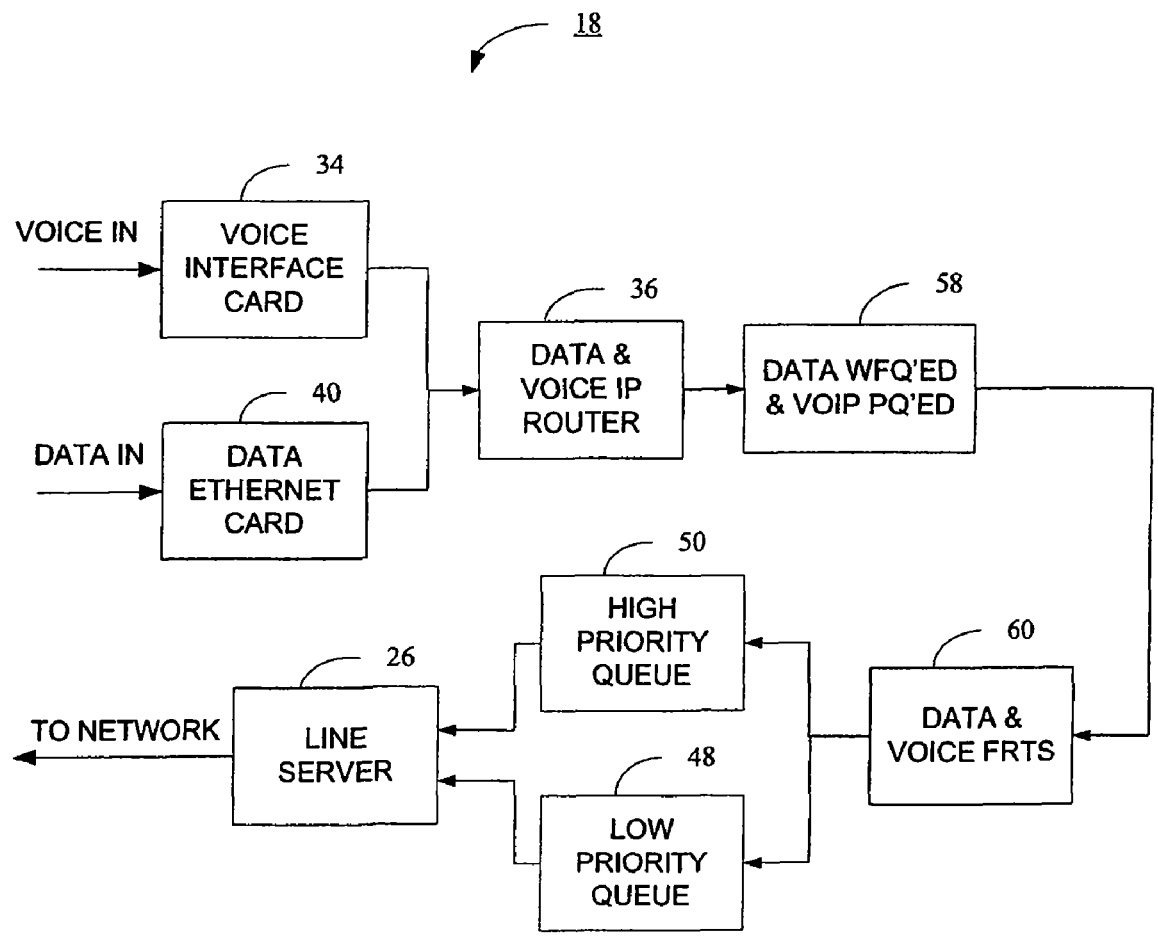
FIG. 3 is a block diagram showing functional transmission elements of the router of FIG. 1 in a single PVC system.

With reference now to FIG. 3, an alternate embodiment for router 18 is shown wherein the router is configured to provide a single PVC for operation on an international PSN, the single PVC processing both voice and data packets. In accordance with this embodiment of the invention, voice interface card 34 and data Ethernet card 40 both feed VoIP and other data packets into data and voice IP router 36. Voice is received and packaged identically as described with respect to FIG. 2 above. IP router 36 assigns appropriate priorities in accordance with the engineering rules set out below, along with appropriate addressing, signaling, etc. The prioritized voice and data packets are queued in a single data and voice queue 58 in the queuing structure of a single PVC with the data packets WFQ'ed and the voice packets PQ'ed, VoIP headers compressed as described above and processed accordingly by single data and voice frame relay traffic shaper 60, and distributed accordingly into the high and low priority ingress queues 48 and 50, respectively. The queued data is transmitted onto WAN 16 via line server 26.

Transmission through network 16 (FIG. 1) to high priority voice egress queue 52 and low priority data egress queue 54 occurs substantially as described above. There has thus been described in detail Rule 1 of the below-described rules for determining QoS parameters, as is further set out below.

Figure 5:
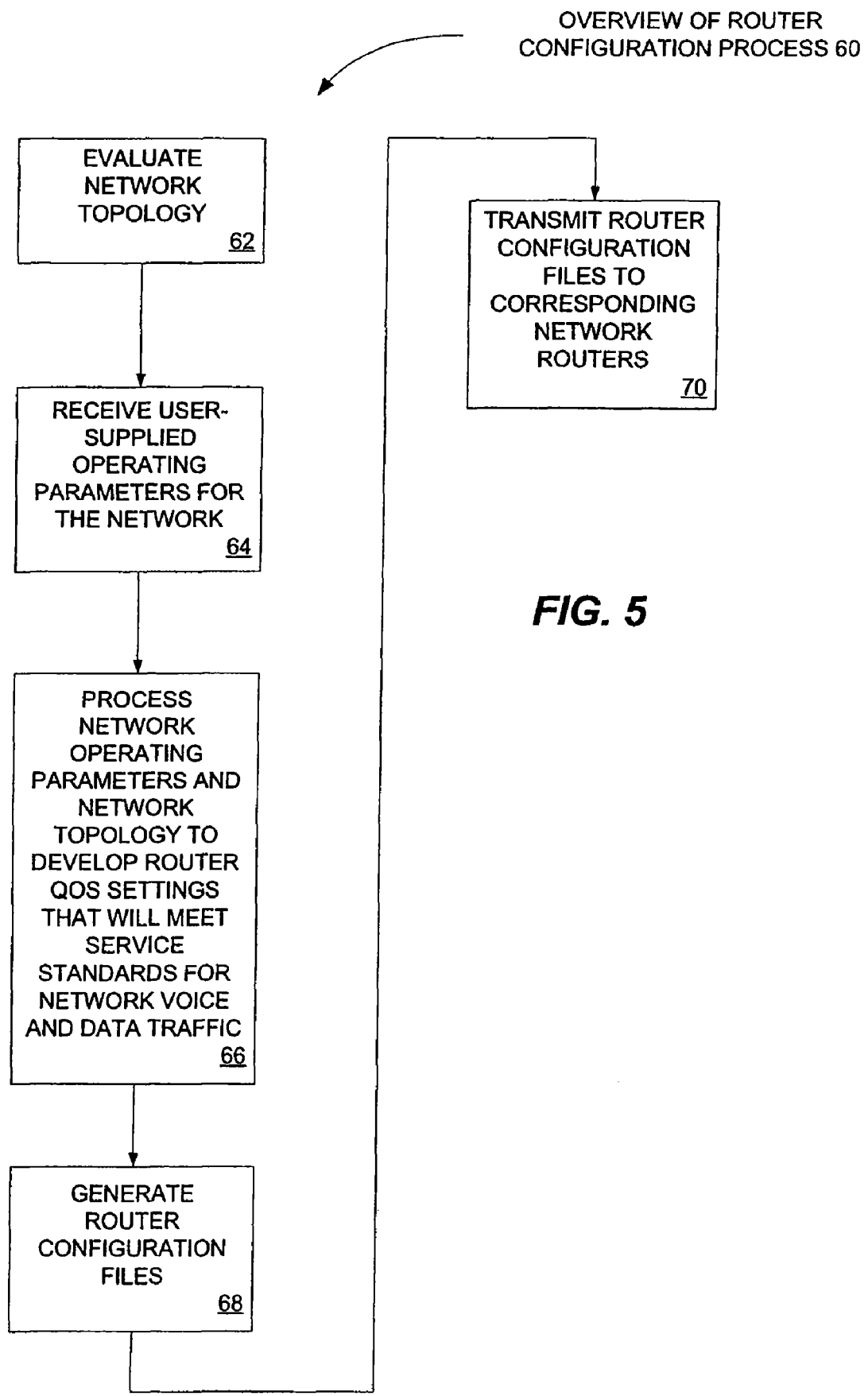
FIG. 5 is a flow chart showing a process for automatically optimizing the QoS settings of network routers in accordance with the present invention.

With reference now to FIG. 5, a process 60 is described generally for analyzing a WAN and determining and setting QoS router parameters. In the described embodiment, this process 60 is operated on server 25 (FIG. 1) but may be operated on any appropriate computer in communication with routers 18 and 20. As noted above, in one embodiment of the invention, the described process is implemented in the form of a Microsoft Windows™-based software tool operable on server 25 through conventional human-user and electronic data interfaces.

Initially, the topology of enterprise WAN 16 is evaluated (step 62) to determine its structural and functional components and their interconnections. Topology features determined include but are not limited to: national vs. international network; number, type and interconnection of routers; access line speeds/CIRs; voice-data and data-only routers; and others as are known to those skilled in the art. This determination of network topology can be performed using conventional software tools, including, for example, Hewlett Packard's Network Node Manager™. Topology features are provided to the software tool through an electronic interface or typed in by hand by an operator. Subsequent to the network topology analysis, user-supplied network operating parameters are received by the system (step 64), typically through a conventional keyboard interface. The user-supplied network operating parameters include but are not limited to: customer data traffic profile; voice volume; transport network capabilities, customer network topology and others known to those skilled in the art.

Subsequent to the determination of network topology and operating parameters, these inputs are processed to determine router QoS settings that will meet standards for network traffic, particularly network voice traffic (step 66). This processing and development of QoS standards is completed in accordance with the present embodiment of the invention through the development of the rules described in detail below.

As background, experimental testing has derived the following general parameters for VoIP service. It will be understood that these service standards may vary for different users with different requirements. It will be further understood that the rules for determining QoS settings as set out below can be straight-forwardly used to generate such settings for different VoIP service parameters.

1) End-to-End Delay:
   ITU-T G114 One-way Delay Recommendation:
      0 to 150 ms: Acceptable for most user applications.
         150 to 400 ms: Acceptable provided that Administrations are aware of the transmission time impact on the transmission quality of user applications. For example, international connections with satellite hops that have transmission times below 400 ms are considered acceptable.
         above 400 ms: Unacceptable for general network planning purposes; however, it is recognized that in some exceptional cases this limit will be exceeded. Examples of such exceptions are unavoidable double satellite hops, satellites used to restore terrestrial routes, fixed satellite and digital cellular interconnections, video-telephony over satellite circuits, and very long international connections with two digital cellular systems connected by long terrestrial facilities.
2) Jitter (variance in delay)<250 ms.
3) Throughput:
   constant bit rate (not strictly true because of VAD and silence suppression).
   Throughput depends on coding algorithms:

TABLE 1

| Compression Algorithm | Bit Rate (kbps) |
|---|---|
| G.711 PCM | 64 |
| G.729 ACELP (codec of choice) | 8 |
| G.723 ACELP | 5.3 |

4) Coding-decoding cycle restriction:

TABLE 2

| Number of G.729 Encodings | MOS (5 = Excellent, 1 = Bad) |
|---|---|
| 1 (applicable for this offer) | 3.92 |
| 2 | 3.27 |
| 3 | 2.68 |

Note:
PSTN voice MOS = 4.1.

5) VoIP Packet Loss<0.3%
6) Service Availability–>100%

These requirements are to be met on links with bandwidth as low as 64 kbps with bursty data traffic on them. Especially stringent are the end-to-end delay and jitter requirements. Considerable jitter makes voice choppy. Both, delay and jitter, are functions of the size(s) of the following queues that a VoIP packet encounters:
   Voice gateway interface queue to network,
   Network per-PVC ingress queue,
   Network priority egress queue,
   Network egress hardware M32 queue.

In accordance with the present invention, rules are provided for processing the network topology and operator parameters noted above to determine the QoS settings for each router. These rules are described below, generally as follows: first, the algorithm implementing the rule is stated; second, derivation for the rules is explained. Where appropriate, router control signals are set out. Also where appropriate, related rules are cross-referenced between one-another.

For purposes of understanding the rules, the following clarifications and definitions apply:
   PVC CIR: The CIR assigned by the FRN service provider, typically at ingress to the backbone. For example, for AT&T, CIR could be assigned on AXIS FRSM switch, which sits at the edge of the backbone. This is distinct from,
   CIR out (the rate at which the FRTS at the gateway sources traffic to the interface for a PVC) and CIR in (the rate at which the FRTS at the gateway accepts traffic from the interface for a PVC).
   Safety factor: There are limitations to throughput, be it port speed or CIR. The present invention does not engineer traffic aggressively to equal the throughput limitation. It does introduce a safety factor=0.9, unless specifically noted otherwise.
   The invention assumes symmetric PVC, i.e., CIRs on both ends of the PVC are equal. Asymmetric PVCs are infrequent; they are not contemplated in the analysis.

For purposes of explanation, the rules are presented in numbered format with descriptive titles. These numbers and titles are for tracking and organizational purposes only and provide no indication of ordering of any type, including ordering of sequence or importance.

Rule 1: PVC Structure

With respect to the number of PVCs:
   Dual PVCs from one national site to another national site: one for voice, another for data.
   Voice PVCs are allocated a high priority egress queue(s) which is provisioned to drain 15 times faster than the low priority egress queue. All data PVCs are allocated a low priority egress queue.
   Single PVC from an international site to a national site, or from one international site to another international site; the PVC carries both voice and data.
   Single PVC (from international to national site) carrying voice and data is assigned high priority egress queue.
   Rule 1 Derivation:
      The dual PVC rule for national sites exploits the QoS feature of priority egress queuing at the backbone egress. With certain known, limited exceptions, this feature is not available in international FRN; the motivation for dual PVC is absent. Below, it is explained why burst characteristics suggest a single PVC for international sites.

Since the single PVC (from an international to a national site) carries voice, there is no option but to assign it the high priority egress queue. The data riding on this PVC gets a performance throughput boost.

Studying quantitatively the high-priority egress queue with 15× draining:

Define:

Egress port speed=S bps.

Average size of voice frame=$V_F$ bits; Average size of data frame=$D_F$ bits.

Factor by which the high queue drains faster than the low queue=Z.

AXIS FRSM in 1 cycle drains Z packets from the high priority egress queue and 1 packet from the low priority egress queue.

In 1 cycle $(RV_F+D_F)$ bits drained from the egress queues. In 1 second, $Z \times (RV_F+D_F)$ bits drained. Hence, $Z(RV_F+D_F)=S. \Rightarrow Z=S/(RV_F+D_F)$.

Average bandwidth available to packets in high queue=$ZRV_F=SRV_F/(RV_F+D_F)$ bps.

Average bandwidth for high queue normalized w.r.t. port speed=$B=RV_F/(RV_F+D_F)$.

For R=15, $V_F$=28 byte (compressed RTP), assume $D_F$=200 byte; B=0.68~70%.

High priority egress queue typically gets 70% of the egress port bandwidth.

Bursting is an attractive feature of, for example, AT&T's FRN. Customer data relies on sustained bursting for high throughput. A key consideration in VoIP design was not to restrict the bursting capability for data (subsequent rules will elaborate on this). Dual PVCs for national solution accommodates this: because of foresight closed-loop rate control and huge ingress queue size (65535 bytes), AT&T's FRN allows voice and data PVCs to have sustained bursts well in excess of their CIRs.

For international FRN, though, bursting is restricted to not much over CIR. In designing a dual PVC solution, data would be restricted to its PVC's CIR. This is bandwidth constraining for data because, even without voice traffic, data traffic throughput is limited by its CIR. Single PVC CIR combines CIR requirements for voice and data. Data traffic can utilize the entire undivided CIR if there is no voice.

Related Rules: 4, 5 and 6

Rule 2: VoIP Priority Queuing at the Router Interface

VoIP frame should queue in high dual first-in-first-out (FIFO) at the interface, data in low.

Rule 2 Router Command:

The router control command:

Command to do that: "ip rtp priority {low UDP port} {high UDP port} {maximum reserved bandwidth for VoIP}, where low UDP port=16384, high UDP port=16383, maximum reserved bandwidth=75% of port bandwidth.

Rule 3: Trunk Sizing

Compute voice traffic volume in erlangs (a) between 2 sites, assuming 22 days per month and 8 hours/day, i.e., a=minutes of calling per month/(22 days/month×8 hours/day×60 minutes/hour). Verify this with customer. For example, calling across different time zone with minimal overlap can under-estimate the resources.

Usually customers desire a certain blocking probability for VoIP calls. Use the Erlang-B blocked calls cleared (BCC) model: input(traffic volume, blocking probability), output(number of trunks to PBX). Note a digital trunk is a DS0; an analog trunk is implemented by a 4/6-wire cable.

If customer insists on minimizing telecommunication charges, compute the following table (Refer traffic volume=a erlangs; number of trunks=c; blocking probability=B(c,a)):

TABLE 3

| c | B(c, a) | Site-to-site communication cost [(1 − B(c, a) traffic is VoIP; sized PVC costs + router and PBX card costs)) + (B(c, a) traffic over PSTN × per minute rate)] |
|---|---------|---|
| 1 | | |
| 2 | | |
| 3 | | |
| 4 ... | | |

Pick the row ("c") with minimal communication cost.

The above discussion is for two sites, i.e., sizing trunks for site A to site B communication. If site A also communicates with site C, there will similarly be derived trunk size for site A to site C calls—and these trunks packaged in a different trunk-group (otherwise, a situation can arise where voice PVC between A and B carries more calls than its CIR'ed for, deteriorating existing calls). Thus, there will be 2 trunk-groups at site A's PBX and gateway: A-B trunk group and A-C trunk group; PBX (via dial-plan) will not allow A to B calls to originate on a trunk in A-C trunk group. Similarly A to C calls cannot seize A-B trunk.

There is a specific VoIP architecture where this can be simplified. Consider a common strict hub-n-spoke FR architecture for all PVCs carrying voice. In this case, for our example above, we can combine A-B and A-C trunk groups at site A in one giant trunk group A. This is advantageous because it leads to better trunk utilization.

Rule 3 Derivation

Erlang-B BCC is standard in sizing trunk resources in telephony. Mathematical extensions to Erlang-B that cover minimizing costs and overflow for VoIP are beyond the scope of that sizing. The Table 3 above, however, does exactly that: sizes resources for minimizing communication costs. It is straight-forward and self-explanatory.

For example, PBXs at Detroit and Mexico City reserve 4 trunks each for voice traffic between them; we illustrate how we derived it.

Assume 5400 minutes of calls from Detroit to Mexico City between Nov. 1, 1998 to Dec. 31, 1998. Customer informs that calls the other way—between Mexico City and Novi—are similar in volume. Total call volume=10800 minutes for the 2 month period.

Assume further, that calls are uniformly distributed over 8 hours in a working day; there are 22 working days.

a=10800 minutes/(2 months×22 days/month×8 hours/day×60 minutes/hour)

a=0.508 erlangs (a dimensionless quantity)

Customer desires B(c,a)<=1%.

From the Erland-B table:

TABLE 4

| C | ~ B(c, a) % |
|---|---|
| 1 | 33 |
| 2 | 8 |
| 3 | 1.3 |
| 4 | 0.2 |

There wee sized 4 E&M analog trunks in Mexico City and 4 DS0s (channels) in a DS1 in Detroit. The hardware and software cost for 4 E&M trunks is the same as 3; the recommendation optimizes communication costs.

Rule 4: FR Network Bandwidth

Assume the above has sized for n trunks at site A for site A—site B call volume.

The minimum FR WAN access port speed the offer supports is 56 kbps.

For dual PVC solution, construct a new voice PVC(A, B) with CIR=n×13.328 kbps. For single PVC, CIR for the PVC will be increased by n×13.328 kbps.

Assume site A has total of m trunks (m>n). Ensure that m×12.7 kbps<=safety factor×WAN port speed=0.7× WAN port speed. Here the safety factor is 0.7, not 0.9, based normalized bandwidth available to high priority egress queue (derived in rule (1)).

Rule 4 Derivation:

VoIP with compressed RTP, UDP and IP headers and G729A codec requires 11.2 kbps. Cisco switching technology (AXIS FRSM), which is deployed in AT&T's FRN, assumes that FR frames when inter-worked into ATM cells will result in empty cell space. That wasted cell space contributes towards CIR, penalizing the customer for inefficient ATM cell packing. AXIS FRSM bumps up the ATM bit rate by a factor of 1.44 to compensate. Using Cisco routers as an example, Cisco's logic: 100 byte requires 3 cells or 144 bytes. Hence, the inefficiency=$144/100$=1.44.

VoIP is a 24 byte IP PDU. FRF.5 adds 4 byte FR-SSCS AAL5 header when doing FR/ATM IWF, for a total of 28 bytes. This is accommodated in a 48 byte ATM cell payload, i.e., inefficiency of $48/28$=1.71. This means VoIP frames require further adjustment of $1.71/1.44$=1.19. If we increase VoIP bandwidth requirements by 19%=11.2 kbps×1.19=13.328 kbps. The 4 byte FR SSCS AAL5 header contains 2 byte FR header+2 byte protocol discriminator.

It is described above that VoIP is a 24 byte IP PDU=20 byte VoIP payload+4 byte cRTP. This is not always true; in fact, mostly, it is 22 bytes=20 byte voice payload+2 byte cRTP. The proportion of 24 byte versus 22 byte is unknown; we build in a safety factor by using the higher limit of 24 bytes. An excess of ~7% (28 byte frame versus 26 byte frame) would be excessive because 7% excess is per call; for a large number of calls that adds to be substantial. RTP's control protocol RTCP uses ~5% of RTP's rate. We have not accounted for it. So the sum total is correct.

Continuing with the above example, 4 trunks are required at Detroit to carry voice traffic to Mexico City will result in single PVC CIR being increased by 4×13.328~56 kbps. We chose 64 kbps as a CIR increment:

To account for the overhead due to data frames being FRF.12 fragmented. Earlier they were not.

Should data traffic suffer from performance problems, this may help alleviate those problems.

In our algorithm notation: n=4, m=12 at Detroit.

When FRTS does traffic shaping, it takes into account all overhead that is added by IOS software. This includes:

Q.922 address header

FRF.12 fragmentation header

Network layer protocol discriminator (RFC1490, Cisco-specific, etc.)

FRTS does take into account the duplication of the above headers as a result of FRF.12 fragmentation.

FRTS does not take into account overhead that is added by hardware. This includes:

Frame Check Sequence (2 bytes)

Flag byte (min. 1 octet)

Zero-bit insertion (size is data pattern dependent and can vary from 0 to 16.6%. For truly random data, it is about 1.6%).

Note that this type of hardware overhead is typically also not accounted for by frame switches when computing CIR's, MIR's, PIRs, etc. So it only needs to be taken into account on FRTS, when one is setting traffic shaping values to match a physical line rate, not when setting FRTS parameters to match a CIR on the frame switch.

Notes re. the analysis above:

1. The factor by which voice needs to be adjusted is less than the adjustment we would already do to account for FRF.5 cell packing inefficiency. So when sizing voice calls at 13.3 kbps call, one needn't account for this overhead. We thus calculate the bandwidth per voice call taking into account FCS, flags and zero-bit insertion (at 1.6% for supposedly very random compressed voice) at 12.7 kbps. So one would size port speeds based on 12.7 kbps/call, CIRs based on 13.3 kbps/call, but set FRTS parameters based on 11.2 kbps/call.

2. Lowering the CIR by these factors does NOT lower the effective link utilization. Rather, it prevents FRTS from allowing too much data to be sent because it doesn't account for all the hardware-generated parts of the packet. The TSD has some calculations that shows how much overhead FRF.12 actually adds.

3. The values above do not account for any difference in measuring rates. The FRTS rate control is not synchronized to the actual clocks of the various physical interfaces. FRTS was not initially designed to be absolutely precise, so the CIR values may be off by a few % and there may be some jitter. One needn't be absolutely precise in timing at the FRTS level when the traffic you're pacing just gets interleaved in an interface queue with traffic from other PVC's anyway.

Rule 5: FR Access Oversubscription

Data CIRs oversubscribe available port speed by no more than 2, i.e., for a site with n voice trunks, (sum of CIRs for all PVCs carrying exclusively data+sum of data portions of the CIR for single PVCs)/(port speed−n×13.328 kbps)<=2.

This holds for single and dual PVC.

It is critical that one estimate the data portion of single PVC's CIR to correctly represent data rate.

Rule 5 Derivation:

This rule extends a known FRN network design rule. The available portion of the port bandwidth is oversubscribed by 2 so that independent sources of data randomly bursting at different times keep the port bandwidth well utilized for maximal throughput. If over subscription>2 is permitted, data traffic will cause congestion in the WAN interface queue in the gateway. Data packets are tail-dropped, leading to poor throughput because of oscillation.

In the ongoing example, the interface for voice in Mexico City has port speed of 256 kbps (to Detroit). Since Mexico City has 4 trunks, the port bandwidth available for data is (256 kbps−4×13.328 kbps)=~200 kbps. Sum of data portions of CIR for all PVCs on s0/0 Mexico City gateway should not exceed 400 kbps.

The following rule 6 deals with sizing the parameter of the gateway router.

Rule 6: FRTS's CIR Out For Dual PVC Solution Over High Speed Egress Link.

For a PVC carrying data exclusively: FRTS's CIR out for data=min(ingress port speed, egress port speed)×safety factor, if egress port speed>=256 kbps.

For a PVC carrying voice exclusively: FRTS's CIR out for VoIP=min(ingress port speed, egress port speed)×safety factor, if egress port speed>=256 kbps.

Rule 6 Derivation:

It has been described that the ability for data to have sustained bursts is a critical feature. However, data burst is limited by the physical port speed of the links it traverses. We assume the backbone has infinite port speed; typical LAN port speeds are well in excess of WAN access port speed. The bottleneck is thus the minimum of WAN ingress and egress port speeds.

VoIP packets egress from the high priority egress queue. This queue does not congest because:

Voice is a constant throughput application that doesn't burst in spurts.

The next rule explains that for low port speeds, we have to further constrain the solution to avoid congesting FRN M32 queue. Thus, minimum port speed will be seen to be >=256 kbps.

Assuming voice and data PVCs between Detroit and East Lansing. Detroit's FRTS CIR out for frame-relay class data East Lansing=min(1536 kbps, 768 kbps)×0.9=791.2 kbps. Similarly for voice, frame-relay class voice East Lansing=min(1536 kbps, 768 kbps)×0.9=791.2 kbps.

Related rules to rule 6: 1, 3, 7

Rule 7: FRTS's CIR Out For Dual PVC Solution Over Low Speed Egress Link.

Confirm egress port speed<256 kbps.

Define Voice+Data Bandwidth=egress port speed×safety factor=egress port speed×0.9.

Data Bandwidth=Voice+Data Bandwidth−n×13.328 kbps, where n is the number of trunks to the PBX at the site with low speed link.

For all sites that have voice PVCs to this site, FRTS's CIR out for voice=min(ingress port speed, egress port speed)×safety factor For all sites that have:
    Direct PVCs to this site, and
    Send data over this PVC
FRTS their data such that the sum of their data rates<Data Bandwidth. This means: FRTS CIR out on data PVC at the remote sites such that the sum of CIR out's for all remote sites<Data Bandwidth.

Rule 7 Derivation:

Low egress port speeds present a special problem. AT&T's FRN's AXIS FRSM switch has egress M32 queue: a hardware queue with 6000 byte capacity. If the low priority egress queue where data PVCs drain into is full, then the 6000 byte M32 queue would be full too. A VoIP packet that got de-queued from the high priority egress queue quickly but is now stuck at the end of M32 queue would be problematic, suffering 6000 byte/64 kbps=750 ms delay, unacceptable for voice. Care must be taken that, for low speed egress link, not only the high priority egress queue but also the low priority egress queue is congestion-free as well.

We have stated that all sites that send data on direct PVCs to low speed link site must have the sum of data rates<Data Bandwidth. Ideally, we partition Data Bandwidth among the multiple sites knowing the network design parameter: a measure of data traffic that each site sends to the low speed link site. FRTS the CIR outs at the distant routers such that:

CIR out for the distant router is proportional to that site's share of traffic it sends to the low speed link site.

Sum of all CIR out's at distant routers for PVCs to the low speed link gateway=Data Bandwidth.

If one doesn't know the traffic characteristics, divide the Data Bandwidth equally amongst the CIR out's on distant routers.

We exemplify with respect to the test bed architecture not having a low speed link<256 kbps. San Francisco gateway has FR port speed of 64 kbps. It can support 2 simultaneous calls to the handsets, i.e., n=2. Data Bandwidth=64×0.9−2×13.328=30.944 kbps. Only San Jose has direct PVC to San Francisco; its data to San Francisco rides DLCI 239 on serial 0/1.5. FR class data-San Francisco has CIR out of 32 kbps.

Related rules to Rule 7: 1, 3, 5

Rule 8: Number of C-RTP Calls a Cisco Class 2600/3600 Router can Support

Number of simultaneous compressed RTP, UDP, IP (cRTP) calls through a gateway are limited by CPU throughput limitation.

TABLE 5

| Gateway platform (CPU) | Maximum number of simultaneous cRTP calls |
|---|---|
| 26xx | 14 |
| 3620 (R4700) | 24 |
| 3640 (R4700) | 30 |

This is based on following assumptions:

CPU 1 minute average utilization<=75% so that CPU can accommodate load spikes.

IP data traffic (non-voice) chews up ~7% CPU, expected.

The figures above are for terminating VoIP stream; conservative, therefore, but its best to be safe, specially for real-time voice application. It suggests that uncompressing cRTP (at terminating gateway) is more CPU intensive than compressing cRTP (at originating gateway).

Evaluation done for 36xx, hub router—where the bottleneck exists.

cRTP results on IOS 12.1.5T8b.

Rule 9: FRF.12 Fragment Sizing

Compute 10 ms Delay FR Size=(port speed×10 ms−4) bytes.

10 ms Delay IP Pkt Size=(10 ms Delay FR Size−6) bytes.

For optimum ATM cell packing efficiency: compute integer N such that 34+48N<=10 ms Delay IP Pkt Size<=34+48(N+1). IP Pkt Size=34+48N or 34+48(N+1).

Rule 9 Derivation:

A key motivation for fragmentation is to reduce serialization delay, and therefore, jitter. (It was observed earlier that jitter can be specially damaging to voice). For example, assuming a 1000 byte frame is at the head of low dual FIFO queue at the San Francisco gateway port interface. Further, assume high dual FIFO is empty, i.e., no VoIP packets queued. As soon as the gateway places the first few bits of data on the link, a VoIP packet queues in high dual FIFO. VoIP packet must patiently wait for 1000 byte/64 kbps=125 ms. The interface queue adds as much jitter as 125 ms–half the permissible maximum in one queue alone. The solution is to fragment 1000 byte frame into 82 byte frames. In our scenario: after the first 82 byte frame is transmitted, the VoIP frame will go next followed by pending data frames. VoIP is thus interleaved with fragmented data packets reducing queuing delay to ~10 ms.

10 ms Delay FR Size does not consider the hardware stuffed 1 byte flags at each end of frame nor the 2 byte FCS. Hence, 10 ms Delay FR Size=(port speed×10 ms−4) bytes.

To compute IP PDU, simply subtract 2 byte FR header and 4 byte FRF.12 header from the FR PDU.

The data packet undergoes FRF.12 fragmentation to spawn for example 2 child frames which undergo FRF.5 to yield ATM cells for each child frame. The first cell has a 6 byte header and the second 8 byte trailer in the ATM 48 byte payload. The first cell accommodates 42 byte IP PDU, the second 40. In general, for a large IP PDU, its distribution among ATM cells would be 42 byte in first cell, 48 bytes in each successive cell, and 40 bytes in the last. To waste no space in ATM cell, IP PDU is fragmented into 42+48×N+40=34+48(N+1), which can be expressed as, 34+48N for integer N.

Per the discussion above, it can be seen why frame 1 is fragmented into an 82 byte IP PDU payload. For 64 kbps, 10 ms Delay FR PDU=10 ms×64 kbps=80 byte.

10 ms Delay FR Size=80−4=76 bytes.

10 ms Delay IP Pkt Size=76−6=70 bytes.

One picks N=0 because 3<=70<=82 bytes. Finally, IP PDU size chosen is 82 bytes. This results in ~10 ms (11.5 ms) serialization delay and efficient ATM cell packing (no wasted ATM cell space in 1.A.1 and 1.A.2).

Rule 10: Maximum Reserved Bandwidth for FR.

Maximum reserved bandwidth for prioritized VoIP flow=min(ingress port speed, egress port speed)×0.75.

Rule 10 Derivation:

This rule provides that VoIP packets will be prioritized per QoS as long as VoIP packets consume<=75% of port bandwidth. After that, they will be treated like regular data frames and queued in low dual FIFO.

The reason is to reserve 25% of the flow for critical network traffic like routing protocols and other best-effort traffic. This 25% also accounts for layer 2 overhead, which is minimal for lightweight protocol like FR. If one provisions maximum reserved bandwidth>75%, one can run the risk of VoIP packets and H.323 signaling starving low priority packets.

Rule 11: FRTSing Sites that Have PVCs to the International Site

Consider an international site. As discussed above, one assumes that international egress queue to this site does not have priority egress queue feature. Confirm that.

For all sites—national and international—that have:
Direct PVCs to this site, and
Send voice and data over this PVC FRTS their PVC traffic such that the sum of their voice and data rates<port speed for the international site. This means: FRTS CIR out on the single PVC at the distant sites such that the sum of CIR out's for all distant sites=safety factor×port speed for the international site.

Rule 11 Derivation:

One does not want to congest the egress queue to the international site because VoIP frames reside in it. The PVCs draining into the egress queue are FRTS'ed so that their cumulative traffic cannot exceed the port speed (the rate at which egress queue is serviced).

Continuing with the example started above, Detroit's s0/0.12 and New York's s3/0.1 have single PVCs to international site Mexico City. These sub-interfaces are FRTS'ed to 115.20 kbps each. Total voice and data rate to Mexico City's egress queue=230.40 kbps=0.9×256 kbps.

Related rules to rule 11: 1

Rule 12: FRTSing International Sites that Have PVCs to a National Site

Consider an international site—for example, site A; Site A has a single PVC, PVC (A, B), to a national site—say site B. PVC (A, B) carries voice and data.

Assuming that the international FR ingress switch does not have bursting capability, to avoid ingress queue build-up, compute CIR $out_1$ of site A's gateway=safety factor× PVC (A, B) CIR.

Single PVC carrying VoIP drains into high priority egress queue to site B. First, consider that PVC(A, B) is the only single PVC to site B carrying VoIP. To avoid high priority egress queue build-up, compute CIR $out_2$ of site A's gateway=RVFS/($RV_F$+$D_F$)−n×13.328 kbps, where n=total number of PBX trunks at site B−number of trunks for A-to-B voice traffic. (Formula derived in Rule 1 above.)

If there are several international sites, including A, that have single PVCs to B carrying VoIP, then sum of the CIR outs of these sites=$RV_F$S/($RV_F$+$D_F$)−national trunks at B×13.328 kbps. National trunks at B means the number of trunks at B sized for B to all other national sites' voice traffic. This voice traffic rides voice PVC per rule (1) which empties into the high priority egress queue at B.

Configure CIR out for gateway A's PVC(A, B)=min(CIR $out_1$, CIR $out_2$).

Rule 12 Derivation:

Deriving Mexico City's FRTS CIR out for s0/0.4. In this case, site A=Mexico City, site B=Detroit, PVC(A, B)=DLCI 105.

Cir $out_1$=0.9×128 kbps=115.2 kbps.

Cir $out_2$=0.7×1536−8×13.328=968.6 kbps.

Cir out=115.2 kbps.

Related rules to Rule 12: 1

Rule 13: Rate at which a Gateway Receives Traffic

FRTS CIR in for a gateway=45 Mbps.

Rule 13 Derivation:

A gateway should accept traffic at infinite rate. There is no reason to delay voice or data while it sits in the input interface queue of the gateway. A good representation of infinity is DS3 speed=45 Mbps; FR access is usually limited to DS3 or lower.

Rule 14: FRTS Parameter Burst Committed (Bc)

FRTS Bc out=CIR out×10 ms

FRTS Bc in=CIR in×10 ms=450000 bits.

Rule 14 Derivation:

Ts=10 ms because one does not want VoIP packets delayed at the FRTS server. The below example explains.

Consider default Ts=125 ms:

VoIP frame arrives at time=130 ms. VoIP bits have to wait for 250−130=120 ms in the FRTS's PQWFQ. This is too much delay. The delay can be reduced to Ts=10 ms; VoIP bits are deposited in high dual FIFO without delay.

This rule assumes typical implementation using CIR, Bc concepts; if the implementation is different, then this rule is not essential—but it is advisable to select Ts=10 ms to be safe.

Rule 15: Hold Queue Sizing

Hold queue refers to the interface queue. It is dual FIFO for voice gateways: voice and FR LMI in high dual FIFO and other data in low.

Hub router hold queue size=32 frames. This means low and high dual FIFOs can accommodate 32 and 64 frames respectively.

Remote router hold queue size=25 frames. This means low and high dual FIFOs can accommodate 25 and 50 frames respectively.

Rule 15 Derivation:

Default hold queue size is 128 frames>>32 frames we recommend. Large queue sizes can accommodate greater data bursts without tail-drops—leading to higher throughput. The reason for the selection is to reduce signaling cut-through delay. Cut-through delay is defined as the time elapsed when a person answers the phone and when he hears voice from the other side.

Signaling protocol in the H323 suite—H.225 and H.245—are not accorded priority at the interface. Like the rest of data, they are deposited in the low dual FIFO as illustrated in FIG. 2 above. Consider a H.245 message that is at the last position in the 128 frame queue that is being drained at 128 kbps; assuming 100 byte frames, that means H245 message would wait for a lengthy 800 ms in low dual FIFO. Bearer capability exchange H.245 typically exchanges 10 TCP/IP messages each way between gateways. That is at least 8 sec total delay. If the called party answers the phone quickly, he will hear nothing for several seconds—unacceptable in voice communications.

A long-term fix is the Fast Connect feature in IOS 12.1.5T8b which tunnels H.245 message in the H.225 Setup message. But for routers on older IOS (12.0.7T) because of memory limitations, the hold queue size was reduced to reduce signaling message delay.

For hub site, hold queue is 32 frames>25 frames for remote because traffic from remote sites transit the hub site. Hub site's low dual FIFO is more congested with a higher tail-drop drop probability. There can be an insignificant probability that H.245 TCP's SYN message is tail-dropped—that is fatal as H.245 TCP connection never recovers (to the called party it appears like infinite cut-through delay).

VoIP's high dual FIFO hold queue is 50 and 64 frames on remote and hub routers respectively. VoIP frame loss probability−>0, below VoIP applications' requirement of 0.3%.

Rule 16: Data Prioritization via IP Precedence.

Data traffic to be prioritized can be assigned IP Precedence=5. If there are several data traffic types to be prioritized, assign IP Precedence=1 through 5 to the different types depending on their relative priorities.

The maximum number of FRTS's WFQs should be 4096 for single PVC and 256 for dual PVC.

Rule 16 Derivation:

Setting high IP precedence for a data traffic ensures that FRTS's WFQ drains that queue faster. WFQ$_i$ for an FRTS server drains at=FRTS's CIR out×[(IP Precedence$_i$+1)/(Sum of (IP Precedences for all flows in the WFQ+1))]. For example, in the described example Detroit's QAD traffic assigned IP Precedence=5.

Distinct flows are mapped by a hashing function into different queues of the WFQ. Sometimes, hashing collisions occur and two distinct flows are mapped into the same queue; this deteriorates the performance of the 2 data traffic types stuck in the same queue. Increasing the number of possible queues in WFQ decreases this probability.

This gets worse when voice and data ride the same PVC, i.e. if VoIP packets got mapped to the same queue as a data flow. To ensure that it is unlikely, one uses 4096 as the maximum number of WFQs at both gateways of a single PVC.

Rule 17: VoIP Prioritization via IP Precedence.

VoIP traffic flow is assigned IP Precedence=7.

Signaling traffic flow is assigned IP Precedence=7.

The maximum number of FRTS's WFQs should be 4096 for single PVC and 256 for dual PVC.

Rule 17 Derivation:

Setting high IP precedence for signaling and voice is defensive configuration. It does not result in higher throughput. For example, Detroit's dial-peer 100 VoIP's IP Precedence=7; set ip precedence network for signaling through extended access-lists and policy maps.

Distinct signaling flows are mapped by a hashing function into different queues of the WFQ. Sometimes, hashing collisions occur and two distinct flows are mapped into the same queue; this deteriorates the performance of the 2 data traffic types stuck in the same queue. Increasing the number of possible queues in WFQ decreases this probability.

With reference now again to FIG. 5, subsequent to the determination of the QoS settings in accordance with the rules described above, appropriate router configuration files are generated by server 25 (step 68) and transmitted over the network to the corresponding routers (step 70).

There has thus been provided methods and systems for determining router QoS settings to meet desired VoIP service standards and for automatically generating and transmitting those router settings to accordingly set the router QoS adjustments. In the described embodiment, the invention is implemented as a system tool. The invention has applicability in packet switching networks utilizing routers or equivalent switches having a command interface for receiving operating commands over a network.

There will now be apparent to the reader numerous changes, modifications and improvements falling within the scope of the invention.

What is claimed is:

1. A method of controlling a standard of service of voice communications in an internet protocol packet switching network comprised of a plurality of routers, the method comprising:

determining a standard of service requirement for a voice over internet protocol voice communication;

determining a network topology;

determining a quality of service adjustment available in the plurality of routers;

processing the standard of service requirement and the network topology to determine a quality of service setting for the quality of service adjustment in the plurality of routers; and transmitting the quality of service setting to the plurality of routers.

2. The method of claim 1, wherein each of the plurality of routers comprises a command line interface for receiving the quality of service setting over the internet protocol packet switching network.

3. The method of claim 2, wherein the command line interface is operated by an internetwork operating system.

4. The method of claim 1, wherein the internet protocol packet switching network supports data communications with voice communications.

5. The method of claim 1, wherein the processing comprises generating a router configuration file for each of the plurality of routers, where the router configuration file includes the quality of service setting.

6. The method of claim 5, wherein the transmitting comprises transmitting the router configuration file to each of the plurality of routers.

7. The method of claim 1, wherein the internet protocol packet switching network is supported by an internet protocol over an asynchronous transfer mode protocol.

8. A system for controlling a standard of service of voice communications in an internet protocol packet switching network comprised of a plurality of routers, the system comprising:
a processor;
a memory connected to the processor and storing instructions for controlling an operation of the processor, wherein the processor operative with the instructions in the memory performs steps of:
determining a standard of service requirement for a voice over internet protocol voice communication;
determining a network topology;
determining a quality of service adjustment available in the plurality of routers;
processing the standard of service requirement and the network topology to determine a quality of service setting for the quality of service adjustment in the plurality of routers; and
transmitting the quality of service setting to the plurality of routers.

9. The system of claim 8, wherein each of the plurality of routers comprises a command line interface for receiving the quality of service setting over the network.

10. The system of claim 9, wherein the command line interface is operated by an internetwork operating system.

11. The system of claim 8, wherein the internet protocol packet switching network supports data communications with voice communications.

12. The system of claim 8, wherein said the processing comprises generating a router configuration file for each of the plurality of routers, where the router configuration file includes the quality of service setting.

13. The system of claim 12, wherein the transmitting comprises transmitting said the router configuration file to each of the plurality of routers.

14. The system of claim 8, wherein the internet protocol packet switching network is supported by an internet protocol over an asynchronous transfer mode protocol.

15. A system for controlling a standard of service of voice communications in an internet protocol packet switching network comprised of a plurality of routers, the system comprising:
means for determining a standard of service requirement for a voice over internet protocol voice communication;
means for determining a network topology;
means for determining a quality of service adjustment available in the plurality of routers;
means for processing the standard of service requirement and the network topology to determine a quality of service setting for the quality of service adjustment in the plurality of routers; and
means for transmitting the quality of service setting to the plurality of routers.

16. The system of claim 15, wherein each of the plurality of routers comprises a command line interface for receiving the quality of service setting over the internet protocol packet switching network.

17. The system of claim 16, wherein the command line interface is operated by an internetwork operating system.

18. The system of claim 15, wherein the internet protocol packet switching network supports data communications with voice communications.

19. The system of claim 15, wherein the processing comprises generating a router configuration file for each of the plurality of routers, where the router configuration file includes the quality of service setting.

20. A method of generating a quality of service setting to control a standard of service of voice communications in an internet protocol packet switching network comprised of a plurality of routers, the method comprising:
determining a standard of service requirement for a voice over internet protocol voice communication;
determining a network topology;
determining a quality of service adjustment available in the plurality of routers;
processing the standard of service requirement and the network topology to determine a quality of service setting for the quality of service adjustment in the plurality of routers; and
generating the quality of service setting for the plurality of routers.

* * * * *